United States Patent
Sasidharan et al.

(10) Patent No.: US 9,936,073 B2
(45) Date of Patent: Apr. 3, 2018

(54) INTERACTIVE VOICE RESPONSE (IVR) SYSTEM INTERFACE

(71) Applicant: Verizon Patent and Licensing Inc., Arlington, VA (US)

(72) Inventors: Shan K. Sasidharan, Chennai (IN); Rajesh M. Narayanan, Chennai (IN); Ramya N. Ganapathy, Chennai (IN); Raghuram Ayalurmuralikrishnan, Chennai (IN); Madhumitha Balasubramaiam, Chennai (IN); Deepthi Kameswari, Bangalore (IN)

(73) Assignee: Verizon Patent and Licensing Inc., Basking Ridge, NJ (US)

(*) Notice: Subject to any disclaimer, the term of this patent is extended or adjusted under 35 U.S.C. 154(b) by 295 days.

(21) Appl. No.: 14/791,844

(22) Filed: Jul. 6, 2015

(65) Prior Publication Data
US 2017/0013128 A1 Jan. 12, 2017

(51) Int. Cl.
*H04M 3/00* (2006.01)
*H04M 3/51* (2006.01)
*H04M 1/725* (2006.01)

(52) U.S. Cl.
CPC ....... *H04M 3/5183* (2013.01); *H04M 3/5166* (2013.01); *H04M 1/72522* (2013.01); *H04M 2201/42* (2013.01); *H04M 2203/551* (2013.01); *H04M 2250/60* (2013.01)

(58) Field of Classification Search
CPC .. H04M 3/493; H04M 3/5166; H04M 3/4936; H04M 3/5191; H04M 3/5183; H04M 3/523
USPC ................ 379/88.01, 88.04, 265.09, 265.01
See application file for complete search history.

(56) References Cited

U.S. PATENT DOCUMENTS

| | | | | |
|---|---|---|---|---|
| 7,092,738 | B2* | 8/2006 | Creamer | H04M 1/72583 455/563 |
| 2013/0018788 | A1* | 1/2013 | Johnson | G06Q 20/18 705/43 |
| 2016/0057383 | A1* | 2/2016 | Pattan | H04M 3/4938 348/14.03 |
| 2016/0378454 | A1* | 12/2016 | Nekrestyanov | H04L 67/34 717/170 |

* cited by examiner

*Primary Examiner* — Rasha Al Aubaidi

(57) ABSTRACT

A mobile device, such as a smart phone, receives and presents interactive audio content from an interactive voice response (IVR) system. The mobile device provides an interface that enables a user to navigate through a menu presented in the interactive content. The interface further presents action elements that identify actions that can be requested through the menu, and selection of the one of the action elements may cause the IVR to perform an associated action. For example, the interface may identify representatives at a call center, and a selection of one of the action elements causes the IVR to establish a communication between the mobile device and the selected representative. The action elements may further identify status information associated with the call center, such as an expected wait time.

20 Claims, 12 Drawing Sheets

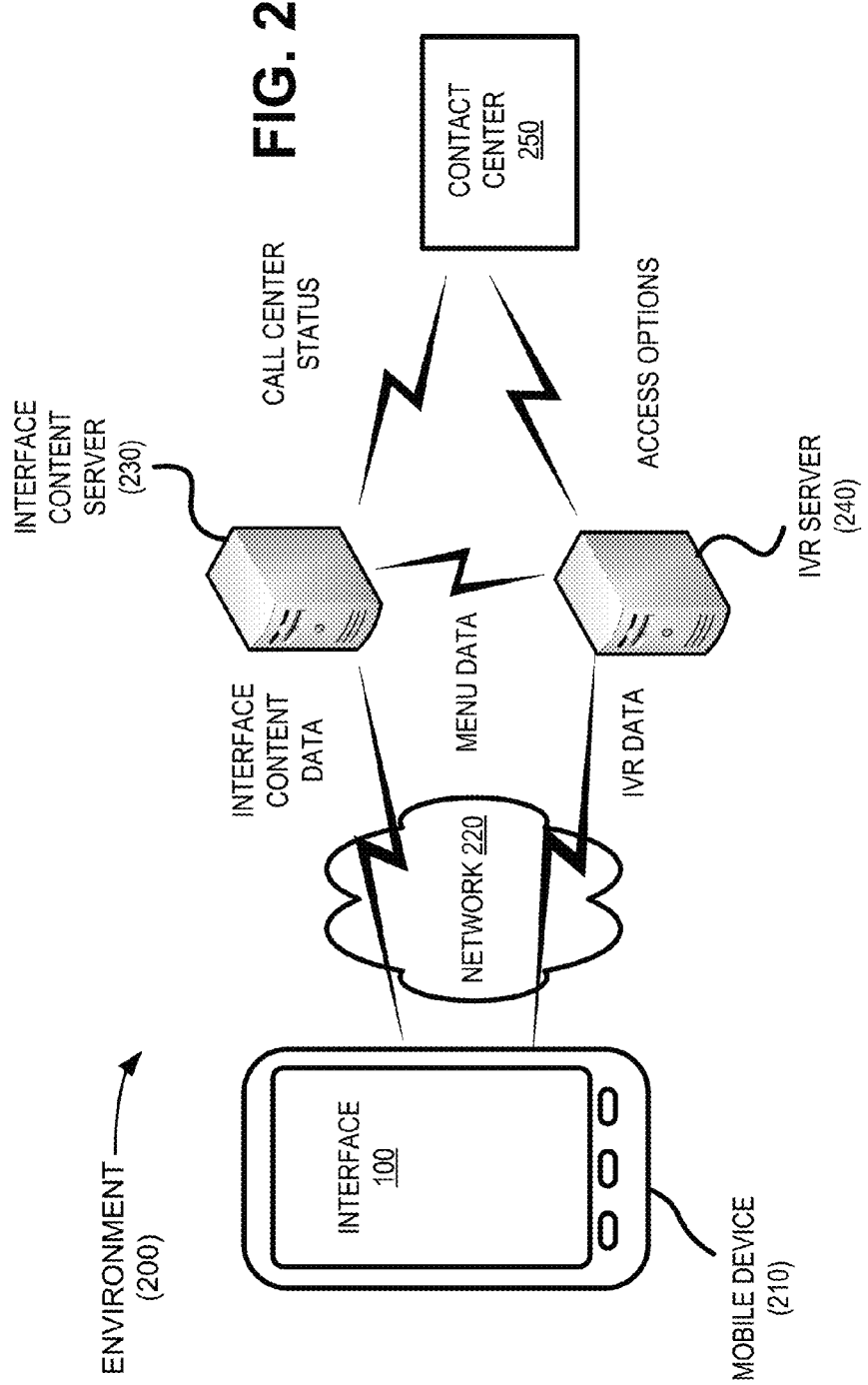

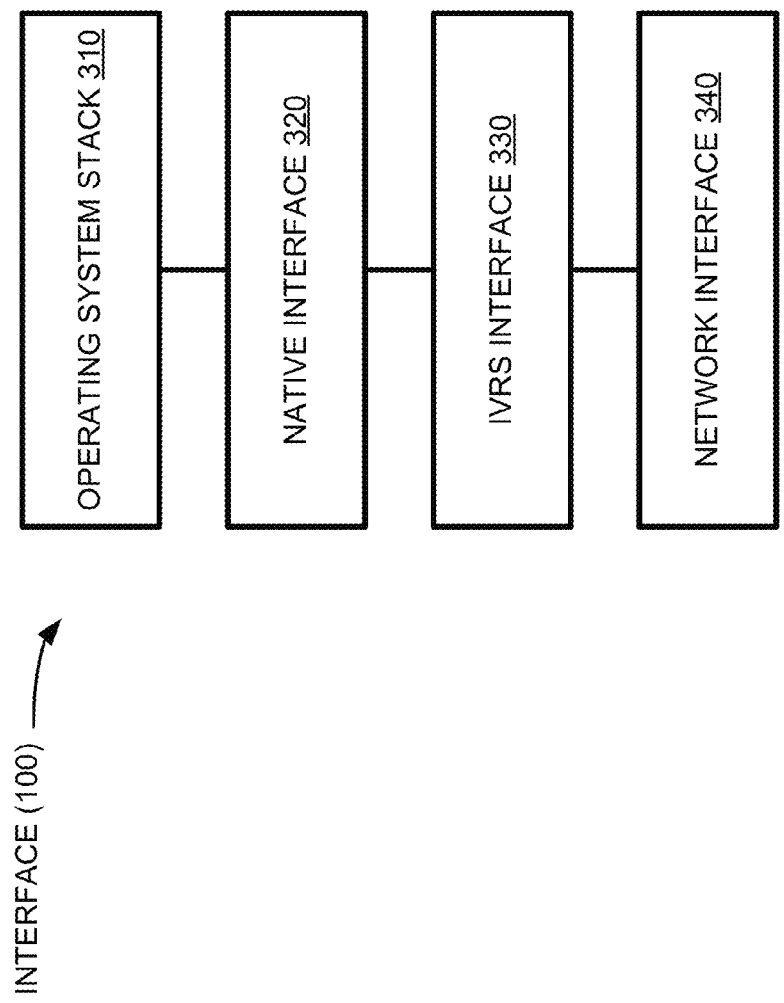

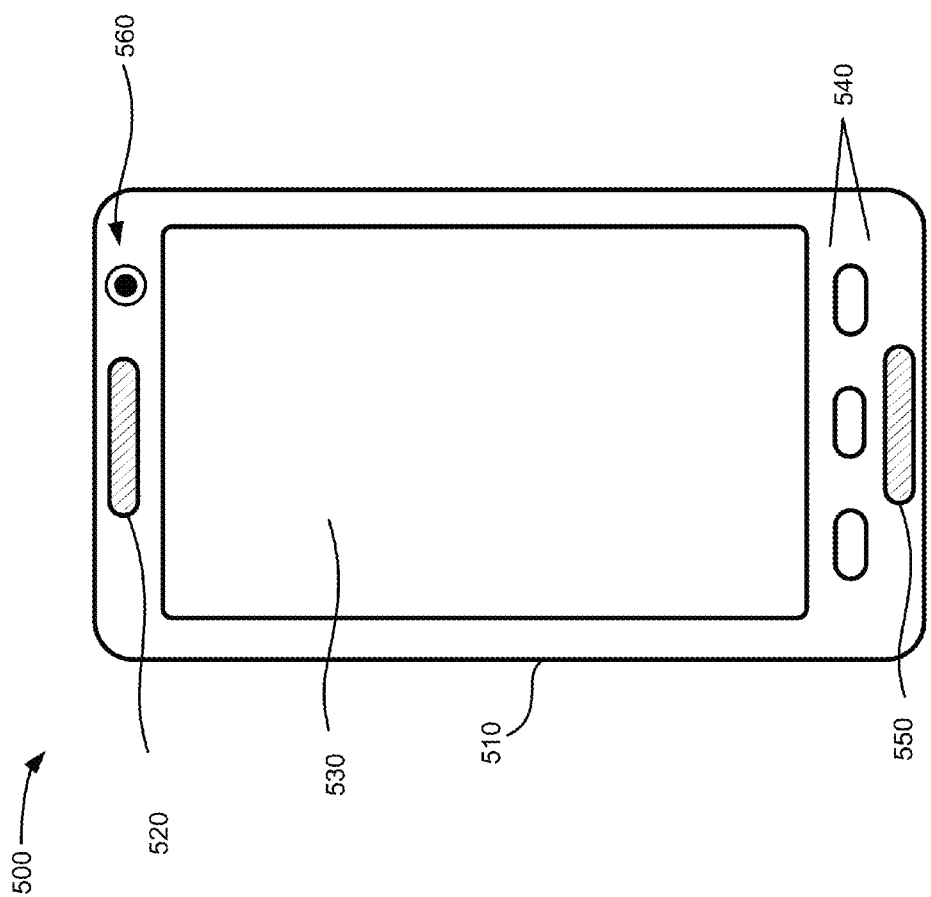

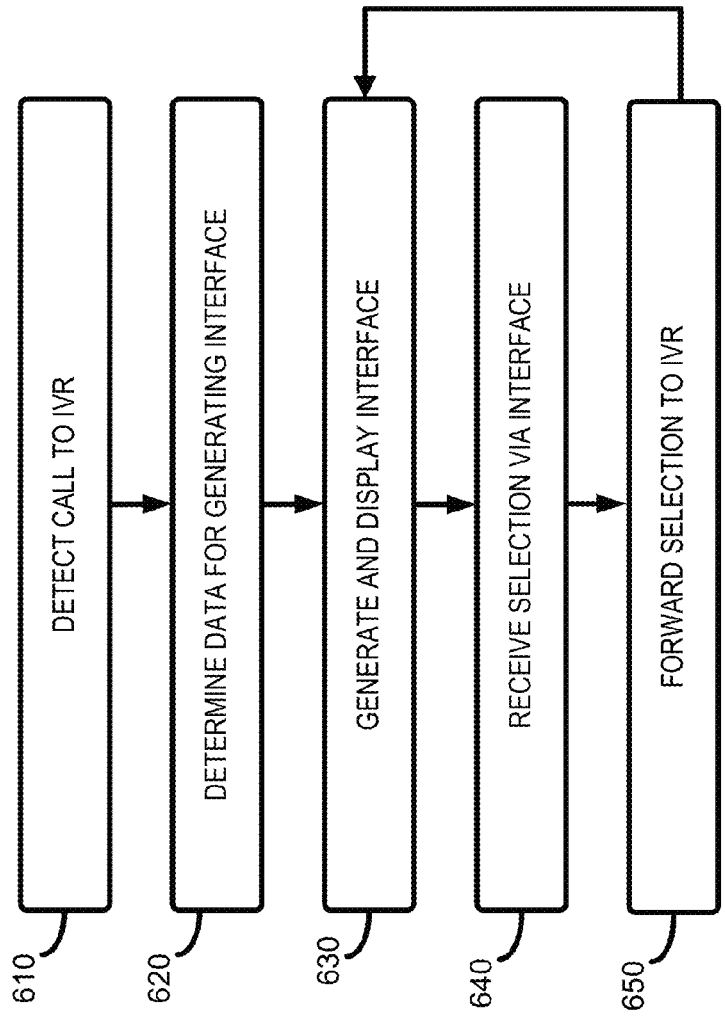

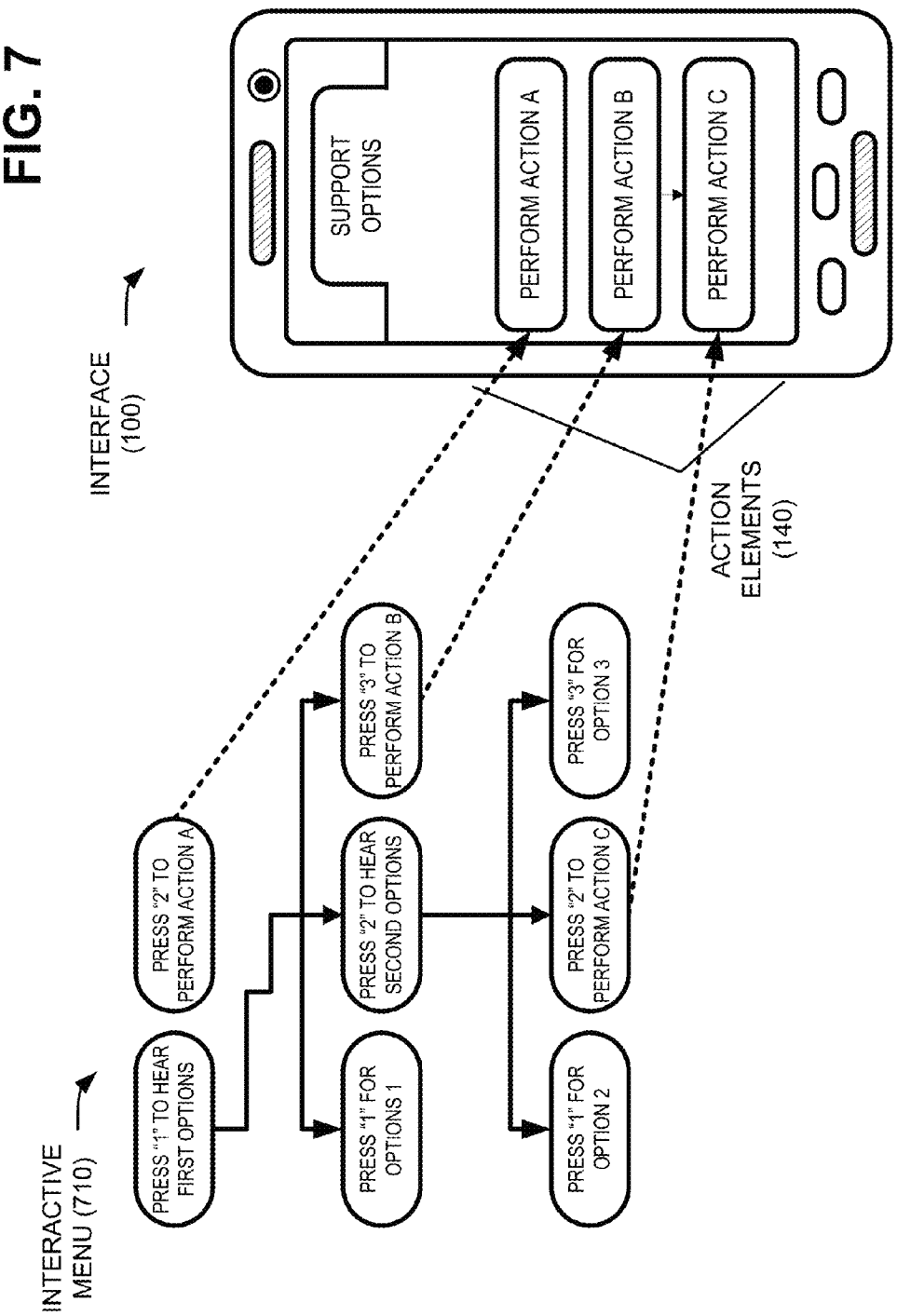

INTERACTIVE VOICE RESPONSE (IVR) SYSTEM INTERFACE

BACKGROUND INFORMATION

A company may use an interactive voice response ("IVR") system to provide automated support to customers and to direct, as needed, telephone calls from customers to representatives. The IVR system may present recorded messages that identify possible menu options to customers. A customer may navigate through the menu options by providing vocal feedback and/or by pressing keys on a number pad to cause the IVR system to perform various actions, such as providing additional menu options or connecting the customer to a service representative.

BRIEF DESCRIPTION OF THE DRAWINGS

FIG. 2 is a diagram illustrating aspects of an exemplary environment according to implementations described herein;

FIGS. 3A and 3B are diagrams illustrating exemplary functional elements of a mobile device included in the environment of FIG. 2;

FIG. 5 is a diagram illustrating exemplary components of a computing device that may be included in the environment of FIG. 2;

FIG. 6 is a flowchart of a process for providing an interface that allows a user to make a selection through an IVR by responding to an interactive dialog provided by the IVR system or through a graphical user interface (GUI) presenting selection options; and FIG. 7 shows an example of how a menu included in an interactive dialog from an IVR may be used to generate action elements included in interface shown in FIGS. 1A-1E.

DETAILED DESCRIPTION OF PREFERRED EMBODIMENTS

Figure 1A:
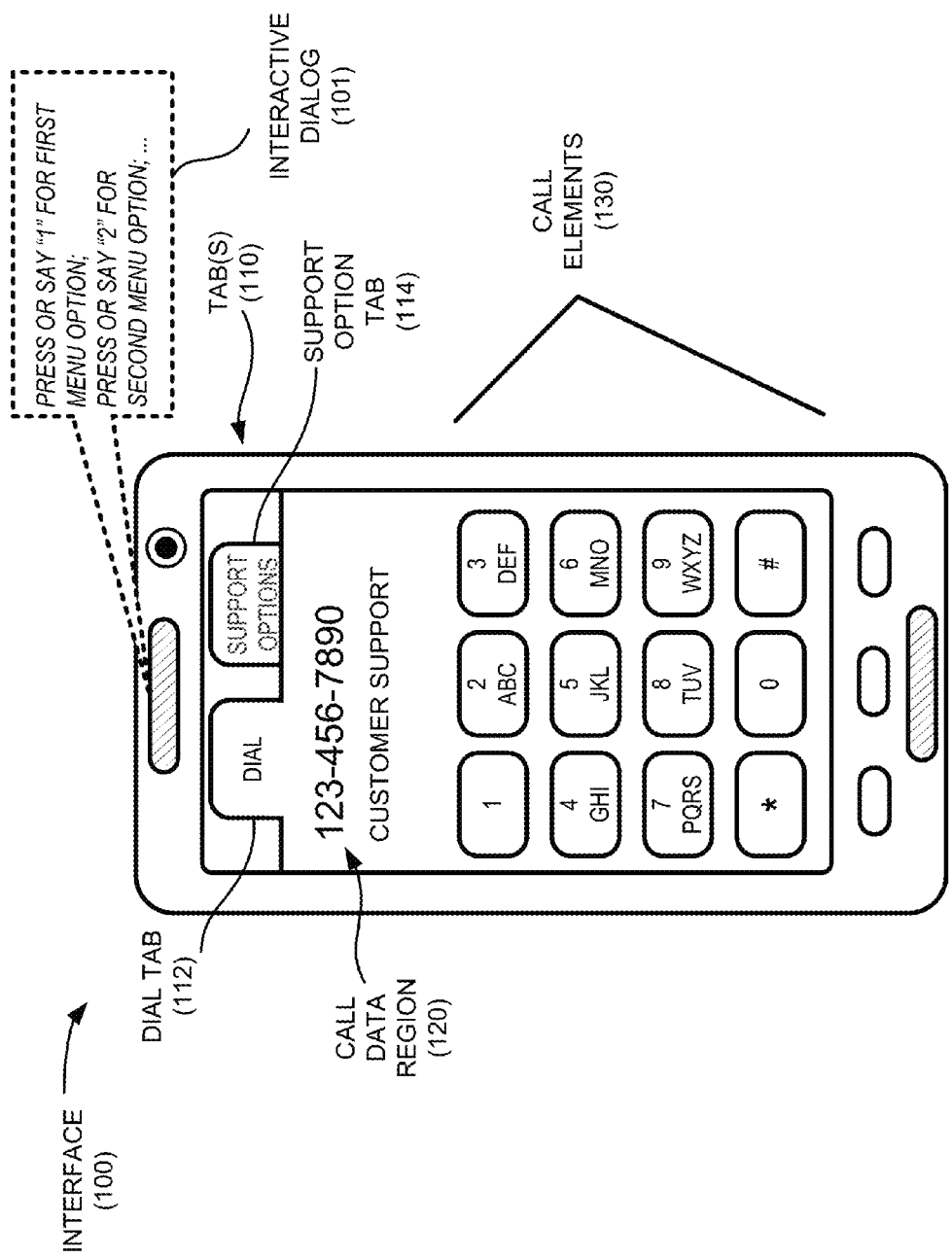
FIGS. 1A-1E are diagrams showing exemplary interfaces according to implementations described herein.

The following detailed description refers to the accompanying drawings. The same reference numbers in different drawings identify the same or similar elements.

In certain implementations, a mobile device, such as a smart phone, receives and presents interactive audio (or multimedia) content from an interactive voice response (IVR) system. The mobile device provides a graphical user interface that enables a user to navigate through a menu presented in the interactive content. The interface further presents action elements that identify actions that can be requested through the menu, and selection of the one of the action elements may cause the IVR system to perform an associated action. For example, the interface may identify representatives at a contact (or call) center, and a selection of one of the action elements causes the IVR system to establish a communication between the mobile device and a corresponding one of the representatives. The action elements may further identify status information associated with the contact center, such as an expected wait time. In one implementation, the interface may omit an action element to contact one of the contacts if the contact is unavailable or if an expected wait time for the one of the contacts exceeds a threshold.

FIGS. 1A-1E show portions of an exemplary interface 100 that may be presented by a user device, such as a smart phone, in according to implementations described herein. In the example shown in FIG. 1A, interface 100 may include tabs 110 that enable a user to select between different portions of interface 100, and interface 100 may include, for example, a dial tab 112 and a support tab 114. Interface 100 may further include other tabs 110, such as an emergency options tab 116 (shown in FIG. 1E). Interface 100 may further include additional or different tabs 110, such as a contacts tab (not shown) related to presenting information about one or more contacts, a call log tab (not shown) for identifying calls previously placed from or received by the user device, a frequently used tab (not shown) identifying telephone numbers that are relatively frequently used to place calls from the user device, etc.

In other implementations, interface 100 may omit tabs 110 and may rely, instead, on an alternative mechanism to enable a user to access different portions of interface 100. For example, a user may submit a particular input or combination of inputs, such as a motion with respect to a touch screen and/or selection of an input button to cause the user device to present different portions of interface 100.

When one of tabs 110 is selected, interface 100 may present information related to the selected tab. A selection of dial tab 112 may cause interface 100 to present a call (or dial) interface related to telephone calls received by and/or initiated through the user device. For example, the call interface may enable user to input a numerical sequence of numbers associated with the telephone number. The call interface may be included in a native interface of a mobile device operating system such as Android® by Google Inc., iOS® by Apple Inc., or Windows Phone® by Microsoft Inc.

In FIG. 1A, the call interface portion of interface 100 may include a call data region 120 that presents information related to a call initiated and/or received by the user device. For example, call data region 120 may present an alphanumeric string (shown in FIG. 1A as "123-456-7890") that identifies a telephone number associated with a call. A telephone number in North America may include a three-digit area code, a three-digit central office code, and four digits for the line number. As shown in FIG. 1A, call data region 120 may present another alphanumeric string (shown in FIG. 1A as "CUSTOMER SUPPORT") that identifies a person or an entity associated with the telephone number. It should be appreciated that call data region 120 may present different and/or additional data than that shown in FIG. 1A. For example, if a call is made to a person associated with contact data stored by the user device, call data region 120 may further present stored information associated with the contact, such as an image associated with the contact, information identifying one or more prior communications exchanged with the contact, an alternative telephone number or other contact information, etc.

As shown in FIG. 1A, a call interface portion of interface 100 (e.g., associated with dial tab 112) may further include call elements 130 that provide a representation of a conventional telephonic keypad. Each of call elements 130 may be associated with one or more alphanumeric characters. For example, the top, center call element 130 is associated with number "2" and with the letters "ABC" and the top, right call element 130 is associated with number "3" and with the letters "DEF." The user device may include a touch screen or other input mechanism that enables the user to select from call elements 130. In another implementation, the user device may include one or more buttons or other input mechanisms that provide a physical keypad, and interface 100 may omit call elements 130.

Call elements 130 may be used to enter a telephone number and/or to place a call. For example, a user may select a particular sequence of numbers via call elements 130 to access an IVR. For example, a user may access an IVR to receive customer service and/or to connect to a customer service representative. When call is placed to an IVR, the user device may provide interactive dialog 101 or other audio data received from the IVR system, and the interactive dialog 101 may present menu options. The call interface portion of interface 100 (e.g., call elements 130) may be used to select from the menu options presented by the IVR system.

In some implementations, when a telephone call or other communication is placed to or received from an IVR (e.g., a user dials a number associated with the IVR system using call elements 130), interface 100 may provide data and/or an input options related to the IVR system. For example, in the example shown in FIG. 1B, interface 100 may present a support options tab 114 when a call is made to an IVR associated with customer support. As shown, a support options portion of interface 100 (e.g., associated with a selection of support options tab 114) may include one or more action elements 140. Action elements 140 may represent possible menu selections that may be accessed via the IVR system (e.g., by listening to interactive dialog 101 and making a selection using call elements 130). In the example shown in FIG. 1B, action elements 140 include "Speak to Representative," "Access Account Data," "Request Technical Support," and "Make a Purchase." It should be appreciated, however, that the particular action elements 140 shown in FIG. 1B are presented merely as examples and, depending on the implementation, interface 100 may provide fewer, different, and/or additional action elements 140.

A user may select from action elements 140 (e.g., contact or otherwise select a portion of an interface 100 displaying a desired action element 140) to request a particular action. For example, a user may select the "Speak to Representative" action element 140 to request a connection to a human service representative. Action elements 140 enable a user to request certain actions by an IVR system without requiring the user to review interactive dialogs and making one or more selections via call elements 130. In this way, the user may achieve a desired action through the IVR system in less time and with less inputs (e.g., than inputs using call elements 130) to select the desired action from the menu options presented in interactive dialog 101.

As described in greater detail below with respect to FIG. 2, action elements 140 may be populated based on data received from an IVR system when a call is placed from the user device to the IVR system. For example, the user device may forward, in connection with the initial call request, information regarding the device and/or the user to the IVR system, and the IVR system may respond with information identifying possible action options that are available to the user and/or mobile device. The user device may then present these actions options via action elements 140.

Figure 1B:
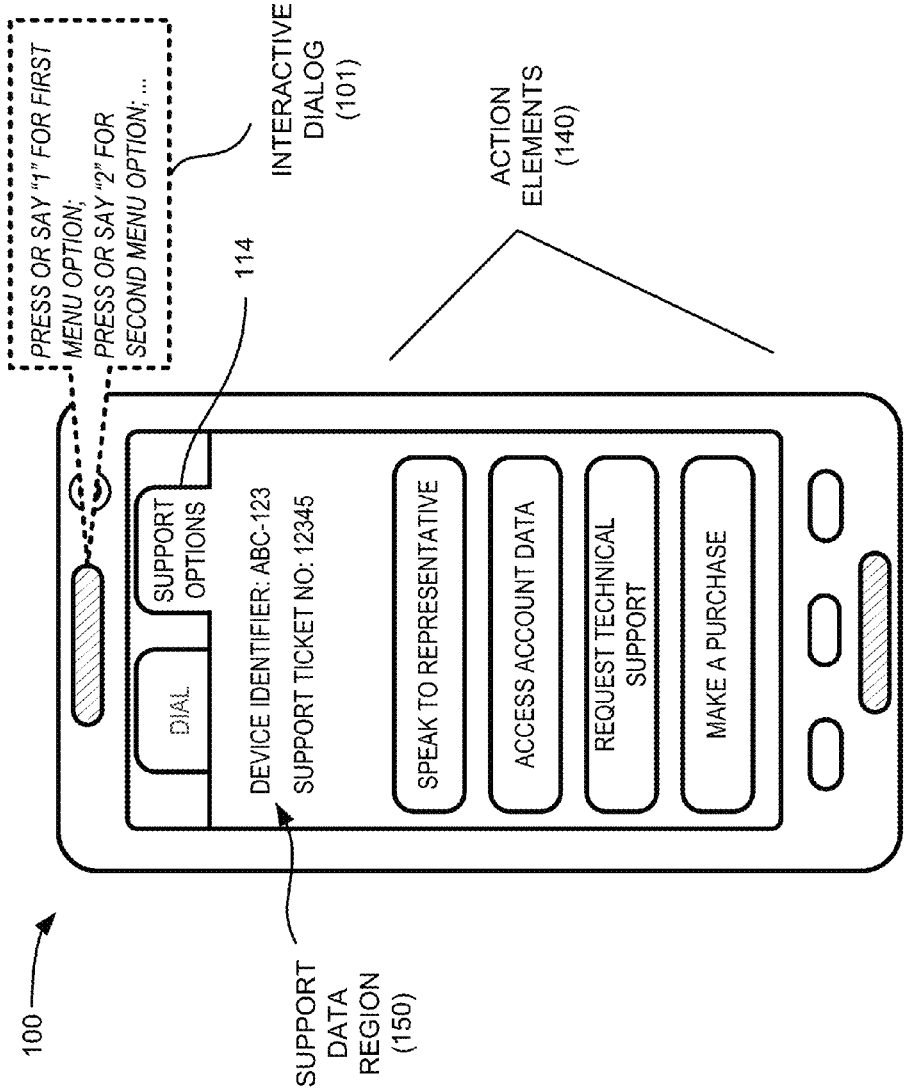

As shown in FIG. 1B, the exemplary support portion of interface 100 (e.g., presented in response to selection of support options tabs 114) may further include a support information area 150 that presents information, related to support, provided by or otherwise associated with the IVR system. In the example shown in FIG. 1B, support information area 150 may present information that may be useful to the user when accessing and/or when performing one or more of the support actions via action elements 140. For example, support information area 150 may present information associated with the user (e.g., an account number) and/or the user device (e.g., "Device Identifier: ABC-123" in FIG. 1B). As shown in FIG. 1B, support information area 150 may further present information received from the IVR system, such as the "Trouble Ticket No. 12345." In this way, a user may access and/or provide information in support information area 150 when speaking with a customer service representative or interacting with the IVR system.

Figure 1C:
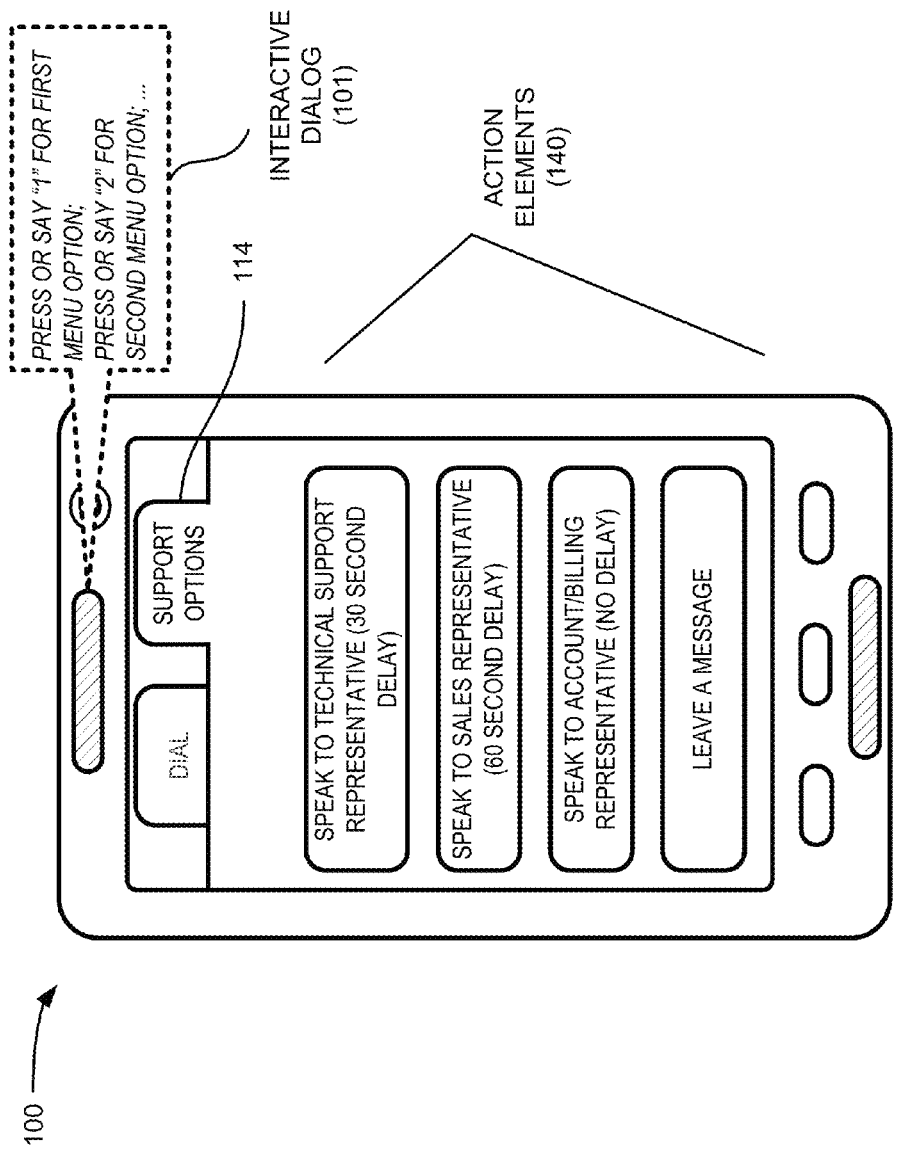

In another example, shown in FIG. 1C, action elements 140 may identify different representatives that are associated with a contact center, and that a user may eventually access using the interactive IVR menu presented through interface dialog 101. As shown, action elements 140 may include an element for giving a user the option to speak to a technical support representative, a sales representative, and/or an account/billing representative; Each of action elements 140 may include information identifying expected delays (e.g., 30 seconds to speak with the technical support representative or 60 seconds to speak with a sales representative). Action elements 140 may include an element with information identifying a representative who does not have an expected delay. Furthermore, one of action elements 140 may allow the user to leave a message for one of the representatives. The option to leave a message may be presented by interface 100 if, for example, an expected delay for speaking to one of identified representatives exceeds a threshold value.

Figure 1D:
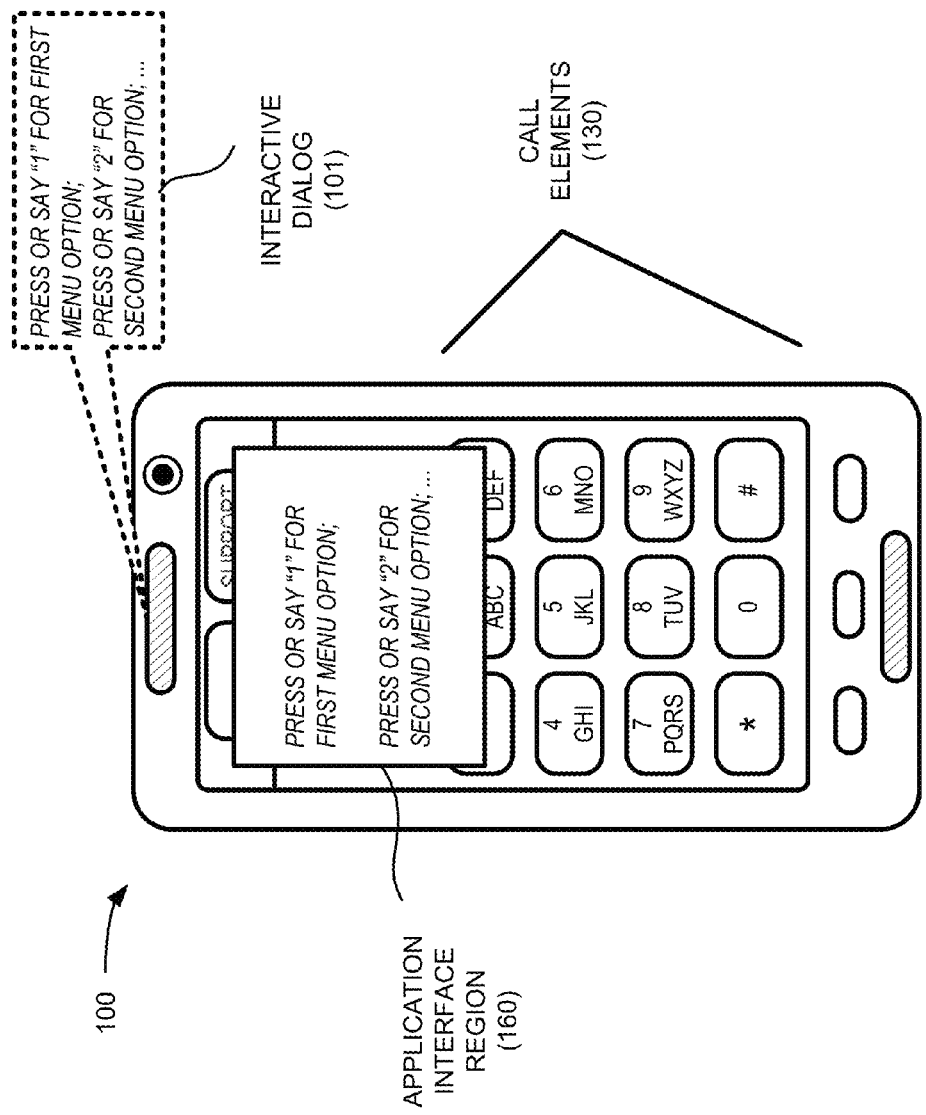

In some implementations, interface 100 may interact with an application running on the user device. For example, as shown in FIG. 1D, the user device may execute an application that presents an application interface region 160. Application interface region 160 may be superimposed on or otherwise presented in connection with interface 100. Application interface region 160 may be associated with an application that operates separately from interface 100. In one example, Application interface region 160 may present data associated with interface 100. For example, an application may perform a speech to text conversion, and application interface region 160 may present a text version of interactive dialog 101. Application interface region 160 may perform other functions and/or present different information. For example, application interface region 160 may present information related to a diagnostic scan of the user device. In this way, application interface region 160 may operate to supplement data received from the IVR system but not otherwise available through interface 100. Furthermore, application interface region 160 may present different data and/or option that are not available via action elements 140.

Although interface 100 has been described in FIGS. 1A-1D with respect providing information related to an IVR for providing customer service (e.g., an IVR associated with a contact center), it should be appreciated that interface 100 may be used to provide data related to accessing an IVR for other purposes. For example, interface 100 may further enable a user to select actions by an IVR for performing financial transactions, requesting a service, making a purchase, etc.

Figure 1E:
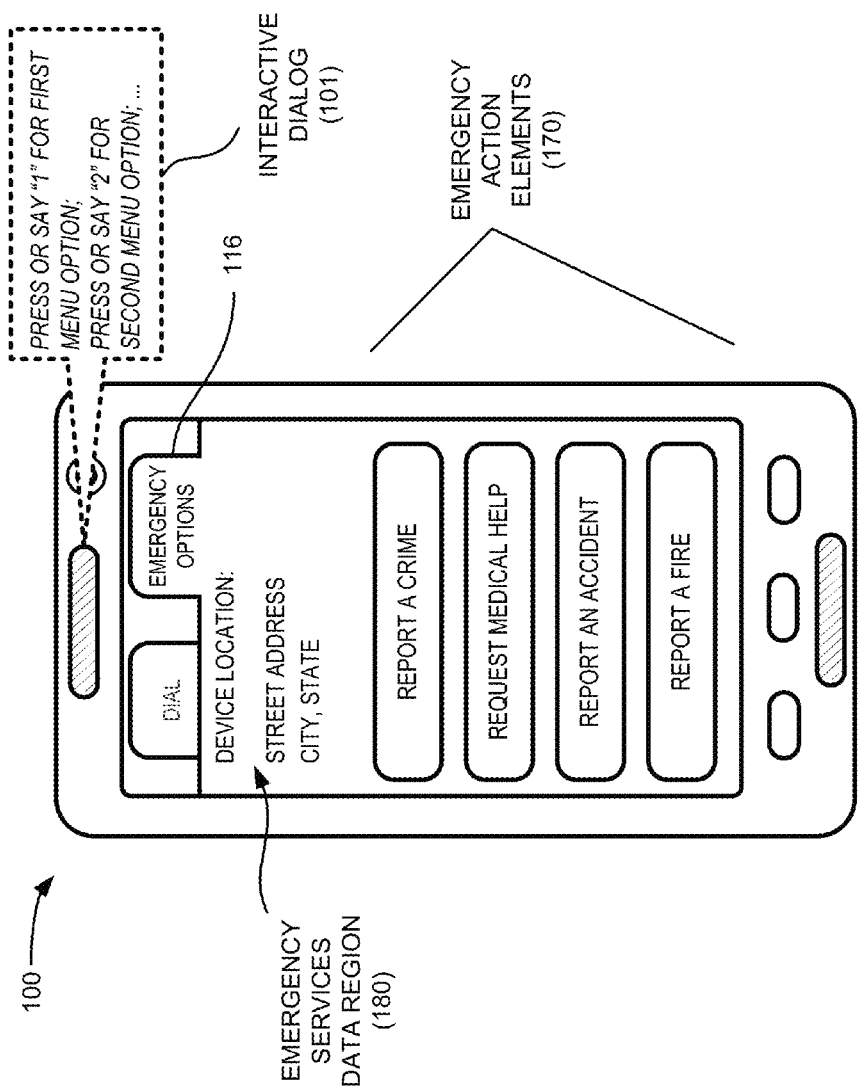

In another example shown in FIG. 1E, interface 100 may include an emergency options tab 116 for selecting action related to accessing emergency services (e.g., an IVR for requesting police, fire, and/or medical assistance). As shown in FIG. 1D, an emergency services portion of interface 100 (e.g., presented in response to a user selection of emergency options tab 116) may present emergency action elements 170 that may enable a user to perform an action, such as to "Report a Crime," "Request Medical Help," Report an Accident," or Report a Fire. The emergency services portion of interface 100 may further include an emergency services data region 180 that may collect and present to a user information related to requesting an emergency service. The user may access the contents of emergency services data region 180 when selecting from emergency action elements 170 and/or speaking to an emergency services dispatcher. For example, emergency services data region 180 may represent a street address and a city, state associated with the user and/or the user device, etc.

Although FIGS. 1A-1E show exemplary components that may be included in interface 100, in other implementations, interface 100 may include fewer components, different components, differently arranged components, or additional components than those depicted in FIGS. 1A-1E. For example, in one implementation, interface 100 may be presented by a device that includes physical buttons or keys that may correspond to call elements 130, and interface 100 may omit call elements 130. Additionally or alternatively, one or more elements of interface 100 may perform functions described as being performed by one or more other components of interface 100. For example, in one example, a call element 130 may be modified to include contents from one or more action elements 100. For example, interface 100 may replace the "#" key.

FIG. 2 is a diagram showing an exemplary environment 200 in which the systems and/or methods described herein may be implemented. As shown in FIG. 2, environment 200 may include a mobile device 210 that receives, via network 220, interface content data from an interface content server 230 and IVR data from an IVR server 240. The interface content data may be used by mobile device 210 to populate one or more portions of interface 100 (e.g., action elements 140), and the IVR data may be used by mobile device 210 to present interactive dialog 101. Interface content server 230 may generate the interface content data based on menu data received from IVR server 240 and/or contact center status data received from a contact center 250. IVR server 240 may generate the IVR data based on access option data received from contact center 250, data received from user device 210, and local data (e.g., menu data).

Mobile device 210 may be capable of presenting interface 100 and interactive dialog 101. In one implementation, mobile device 210 may include a portable communication device such as a smart phone. In other implementations, mobile device 210 may include a phablet device, a global positioning system (GPS) device, and/or another type of wireless device; a laptop, tablet, or another type of portable computer; a media playing device; a portable gaming system; and/or any other type of mobile computer device with communication capabilities.

Mobile device 210 may use the interface content data to provide an efficient, visual representation (e.g., via action elements 140) of menu options that have traditionally been provided via interactive dialog 101 from an IVR system. Using action elements 140 or other elements of interface 100, a user may quickly and efficiently select an action, submit information, and/or choose a correct recipient of a call, thus potentially saving time the user would need to access the IVR system. For example, interface 100 may enable the user to select a desired action (e.g., via the selection of an action element 140) without listening to interactive dialog 101 and making corresponding selections via call elements 130.

In some implementations (e.g., as described above with respect to FIG. 1C), interface 100 may provide up-to-date information in real time, thereby allowing users to make informed decisions on whom to call or when to place calls. For example, the up-to-date information may indicate an expected wait time for each potential call recipient. Companies that use such visual systems may realize a benefit by improving customers' user experience, thereby potentially increasing the goodwill of the company. Interface 100 may be able to provide more visually descriptive information about the purposes of their calls, via interaction with interface 100 while calling the IVR system. Furthermore, interface 100 may render users' inputs, feedbacks, and/or histories immediately available to the call recipient so that the users can be served more efficiently.

As shown in FIG. 2, IVR server 240 may receive access option data from contact center 250. For example, the access options may identify representatives at contact center 250, data that may be accessed via the contact center (e.g., from a contact center server), or other options that may be selected by a user with respect to contact center 250. IVR server 240 may further determine IVR data that identifies content to be included in interactive dialog 101 by mobile device 210.

IVR server 240 may provide menu data to interface content server 230 to identify possible actions options that may be presented to the user via interface 100. For example, the menu data may, in some implementations, include a menu configuration file that is also used in IVR server 240 for contact center 250. As described below, interface content server 230 may generate action elements 140 or other aspects of interface 100 based on existing IVR menus.

Interface content server 230 may also, in some implementations, receive real-time contact center information from contact center 250 (e.g., expected wait times for different telephone numbers associated with the contact center). This type of information may not be available from the contact center 250 and may, instead be collected from a separate device (not shown). The separate device may track the wait time, queuing time, etc. These would be provided by a set of devices that control call parking. Such devices would be connected/coupled to the IVR system.

Interface content server 230 may also, in some implementations, collect user information (such as a user identifier/password, device identifier, or other useful information) from mobile device 210, and interface content server 230 may identify menu options (e.g., contents to be included in action elements 140) that are available to the user and/or mobile device 210.

Interface content server 230 may generate the interface content data that may be used by mobile device 210 to present interface 100. For instance, the interface content data may include information identifying potential call recipients (e.g., different operators) associated with contact center 250.

In some implementations, interface 100 may be generated based on a dynamic extended meta-language (DXML) form. Mobile device 210 may populate the DXML file using the interface content data and/or the IVR data to generate interface 100.

Network 220 may include a local area network (LAN), a wireless LAN (WLAN) (e.g., an 802.11 network) that differs from local network 120, a wide area network (WAN) (e.g., the Internet), a wireless WAN (WWAN) (e.g., a 3GPP System Architecture Evolution (SAE) Long-Term Evolution (LTE) network, a Global System for Mobile Communications (GSM) network, a Universal Mobile Telecommunications System (UMTS) network, a Code Division Multiple Access 2000 (CDMA2000) network, a High-Speed Packet Access (HSPA) network, and/or a Worldwide Interoperability for Microwave Access (WiMAX) network, etc.). Additionally, or alternatively, network 220 may include a fiber optic network, a metropolitan area network (MAN), an ad hoc network, a virtual network (e.g., a virtual private network (VPN)), a telephone network (e.g., a Public Switched Telephone Network (PSTN)), a cellular network, a Voice over IP (VoIP) network, or another type of network. In other implementation, network 220 may correspond to a personal area network ("PAN"), a wireless local area network (WLAN) based on the International Electrical and Electronics Engineers 802.11 protocol (e.g., Wi-Fi®), or other short-range network via which mobile device 210 may communicate with support server and/or IVR server 240 via an intermediate access point (not shown). For example, mobile device 210 and the access point may communicate via Bluetooth®, Wi-Fi®, and/or another wireless network.

Contact center 250 may correspond to an entity, such as a corporation or another type of entity, that provides telephone support for the products or services. For example, a company, such as a finance provider, a manufacturer, or a restaurant, may implement a contact center, and users of the company's products or services may call for support in the use of the products or services. Interface content server 230 may maintain availability information relating to service representative at contact center 250. For example, if no service representatives are available and/or an expected delay to speak with one of the service representatives exceeds a threshold time, interface content server 230 may forward interface content data that includes an option to request a call back at a later time and/or excludes an option to speak to one of the service representatives.

Interface content server 230 may determine the availability information based on monitoring attributes of prior communications to contact center 250. For example, interface content server 230 may determine an average delay that user waits before being connected to a service representative. In another example, contact center 250 may provide interface content server 230 with contact center status information. The contact center status information may include, for example, wait times for various phone numbers and/or departments associated with contact center 250 (see, for example, FIG. 1C). Contact center 250 may include one or more computing devices (not shown) to direct calls to an appropriate representative and to provide status information to interface content server 230 and/or IVR server 240.

Although FIG. 2 shows exemplary components of environment 200, in other implementations, environment 200 may include fewer components, different components, differently arranged components, or additional components than those depicted in FIG. 2. For example, interface content server 230 and IVR server 240 may be included in a single device that provides both interface content data and IVR data to mobile device 210. Additionally or alternatively, one or more components of environment 200 may perform functions described as being performed by one or more other components of environment 200.

FIG. 3A is a block diagram illustrating functional components of mobile device 210. As shown, mobile device 210 may include, for example, an operating system stack 310, a native interface 320, an IVR interface 330, and a network interface 340. Operating system (OS) stack 310 may run mobile device 210 to manage hardware and to provide services for execution of various software.

Operating system stack 310 may act as an intermediary between applications and the computer hardware (e.g., input and output). Native interface 320 may include software for providing a dialing portion (e.g., associated with the selection of dial tab 112) of interface 100, as shown in FIG. 1A, to receive/place a call and or to present audio dialog 101 and to receive selections (e.g., by presenting call elements 130 and receiving a user input).

IVR interface 330 may include software for presenting graphical menu options (e.g. action elements 140 shown in FIGS. 1B and 1C) related to selections from an IVR and other information and forwarding information related to the selections. Network interface 340 may include software/hardware for mobile device 210 to access network 220 and to receive data (e.g., from interface content server 230, IVR server 240, or other network devices/components).

Figure 3B:
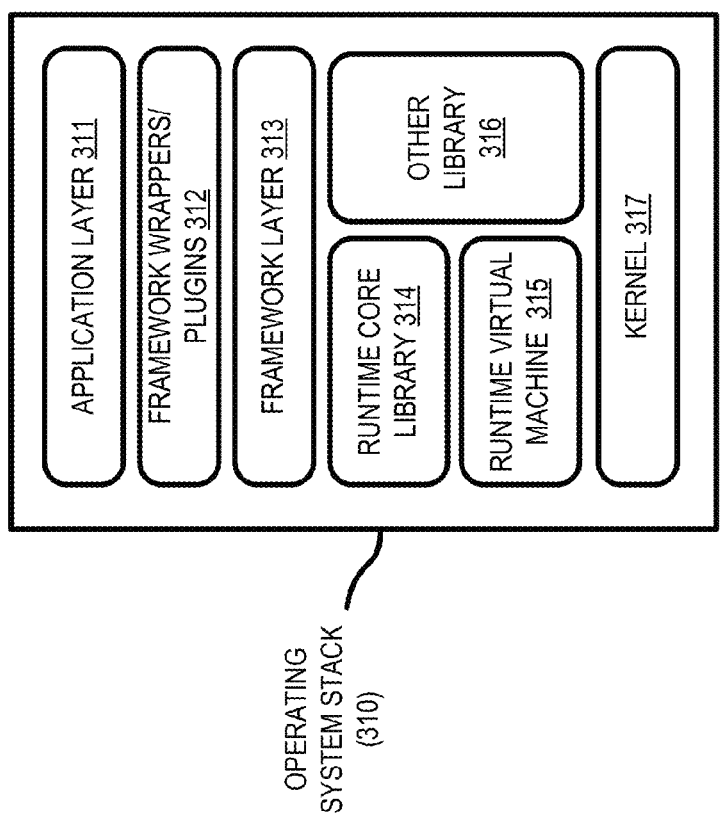

FIG. 3B is a block diagram illustrating an exemplary architecture of operating system stack 310 for mobile device 210. As shown in FIG. 3B, operating system stack 310 may include an application layer 311, framework wrappers/plugins 312 a framework layer 313, runtime core libraries 314, other libraries 316, a runtime virtual machine 315 (e.g., Dalvik virtual machine) and a kernel 317. The application layer 311 may include native or core applications (e.g., maps, browsers, camera, alarm, media player, clock, voice dial, contacts, calculator) as well as any other user-installed applications. In one implementation, interface 100 may be executed through application layer 311.

The framework layer 313 may include framework application programming interfaces (APIs) that are used by the core applications and other applications to take advantage of the mobile device hardware, access location information, store data in internal or external storage on the mobile device, run background services, add notifications, etc.

Framework wrappers/plugins 312 may be deployed (by or to the operating system stack 310) as an add-on or as a firmware update. In one implementation, framework wrappers/plugins 312 may include a module or component that detects when a user is dialing an IVR system and may present interface 100 that provides input options with respect to the IVR system. In this way, interface 100 may operate as a portion of operating system stack 310 and not as a separate application that is implemented via operating system stack 310.

Core and other libraries 314 and 316 may be used by various components of the operating system stack 310 and may provide many functionalities. Example core libraries may include program code or other information that support playback and recording of audio/video and images, managing access to the display subsystem, web browser engine libraries, libraries for bitmap and vector font rendering, system C library, etc.

Runtime virtual machine (VM) 315 may provide an environment in which different applications execute. A mobile application may run in a virtual machine. In addition, the mobile application may run in its own process with its own instance of runtime VM 315. Kernel 317 (e.g., a Linux kernel used in the Android operating system) may act as an abstraction layer between hardware in mobile device 210 and other portions of operating system stack 310, including the application layer 311, the framework layer 313, framework wrappers/plugins 312, core and other libraries 314/316, and runtime virtual machine 315. Kernel 317 may support core system services such as memory and process management, network stack, driver model, and security. In some embodiments, the kernel 317 may include a module or a component that detects when a user dials an IVR system and may present interface 100 that provides input options with respect to the IVR system. In this way, interface 100 may be a part of a stock operating system, or may be integrated within the operating system by device manufacturers, carriers, and/or end users. In some embodiments, the module or component may be deployed as a customized read only memory (ROM) that replaces the firmware on mobile device 210 or as a firmware update to the operating system to provide interface 100.

Although FIGS. 3A and 3B show exemplary functional components of mobile device 210, in other implementations, mobile device 210 may include fewer functional components, different functional components, differently arranged functional components, or additional functional components than those depicted in FIGS. 3A and 3B. For example, mobile device 210 may further include a retail interface (not shown) to enable mobile device 210 to identify mobile application and other digital contents that are available for purchase via mobile device 210. Additionally or alternatively, one or more functional components of mobile device 210 may perform functions described as being performed by one or more other functional components of mobile device 210.

Figure 4:
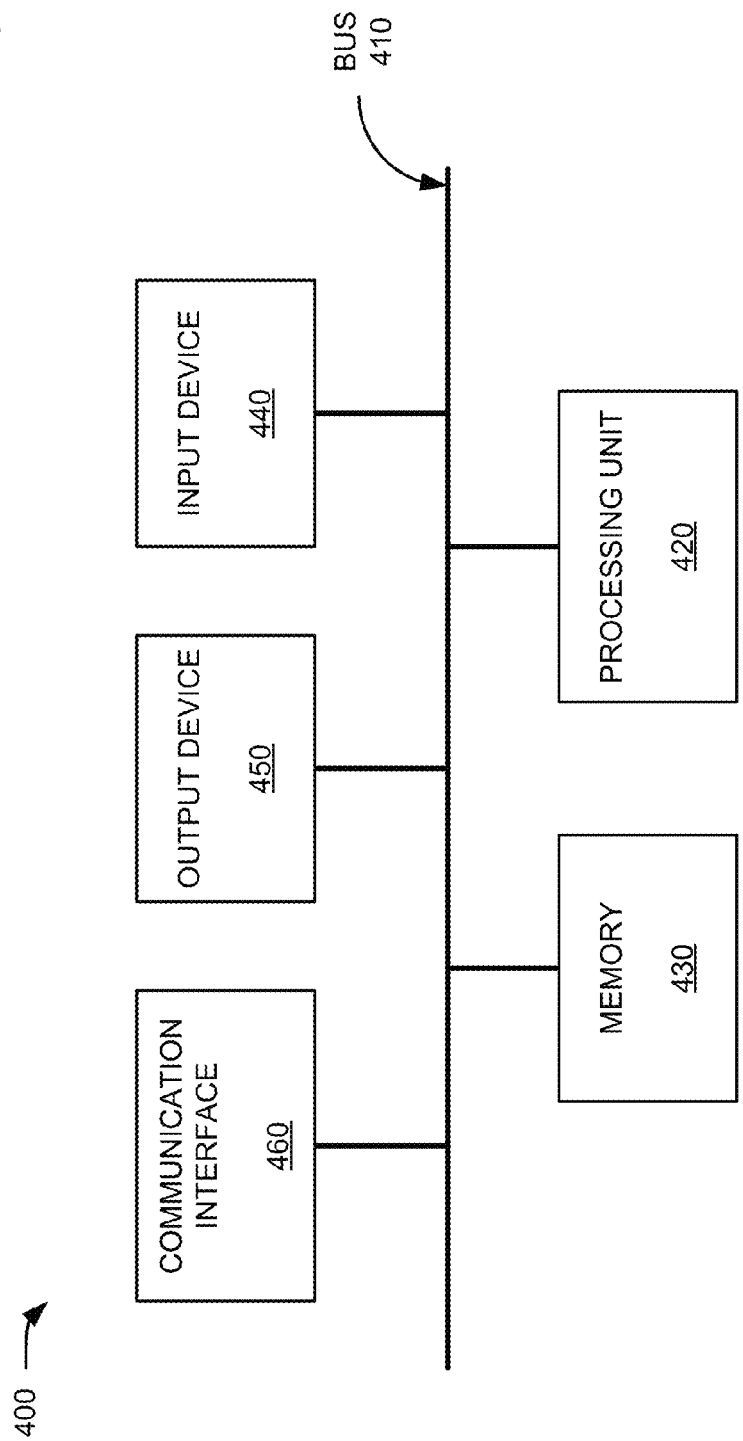
FIG. 4 is a diagram illustrating exemplary components of a communications device that may be included in the environment of FIG. 1.

FIG. 4 is a diagram illustrating exemplary functional components of a computing device 400 according to an implementation described herein. Mobile device 210, an element of network 220 (e.g., a node, router, blade, etc.), interface content server 230, IVR server 240, and/or contact center 250 may each include one or more devices 400. As shown in FIG. 4, device 400 may include a bus 410, a processing unit 420, a memory 430, an input unit 440, an output unit 450, and a communication interface 460.

Bus 410 may include a path that permits communication among the components of device 400. Processing unit 420 may include any type of single-core processor, multi-core processor, microprocessor, latch-based processor, and/or processing logic (or families of processors, microprocessors, and/or processing logics) that interprets and executes instructions. In other embodiments, processing unit 420 may include an application-specific integrated circuit (ASIC), a field-programmable gate array (FPGA), and/or another type of integrated circuit or processing logic.

Memory 430 may include any type of dynamic storage device that may store information and/or instructions, for execution by processing unit 420, and/or any type of nonvolatile storage device that may store information for use by processing unit 420. For example, memory 430 may include a random access memory (RAM) or another type of dynamic storage device, a read-only memory (ROM) device or another type of static storage device, a content addressable memory (CAM), a magnetic and/or optical recording memory device and its corresponding drive (e.g., a hard disk drive, optical drive, etc.), and/or a removable form of memory, such as a flash memory.

Input unit 440 may allow an operator to input information into device 400. Input unit 440 may include, for example, a keyboard, a mouse, a pen, a microphone, a remote control, an audio capture device, an image and/or video capture device, a touch-screen display, and/or another type of input device. In some embodiments, device 400 may be managed remotely and may not include input unit 440. In other words, device 400 may be "headless" and may not include a keyboard, for example.

Output unit 450 may output information to an operator of device 400. Output unit 450 may include a display, a printer, a speaker, and/or another type of output device. For example, device 400 may include a display, which may include a liquid-crystal display (LCD) for displaying content to the customer. In some embodiments, device 400 may be managed remotely and may not include output unit 450. In other words, device 400 may be "headless" and may not include a display, for example.

Communication interface 460 may include a transceiver that enables device 400 to communicate with other devices and/or systems via wireless communications (e.g., radio frequency, infrared, and/or visual optics, etc.), wired communications (e.g., conductive wire, twisted pair cable, coaxial cable, transmission line, fiber optic cable, and/or waveguide, etc.), or a combination of wireless and wired communications. Communication interface 460 may include a transmitter that converts baseband signals to radio frequency (RF) signals and/or a receiver that converts RF signals to baseband signals.

Communication interface 460 may include and/or may be coupled to an antenna for transmitting and receiving RF signals. For example, communication interface 460 may be coupled to an antenna assembly that includes one or more antennas to transmit and/or receive RF signals. The antenna assembly may, for example, receive data from communication interface 460 and transmit RF signals associated with the data, or the antenna assembly may receive RF signals and provide them to communication interface 460 to be processed.

Communication interface 460 may include a logical component that includes input and/or output ports, input and/or output systems, and/or other input and output components that facilitate the transmission of data to other devices. For example, communication interface 460 may include a network interface card (e.g., Ethernet card) for wired communications and/or a wireless network interface (e.g., a WiFi) card for wireless communications. Communication interface 460 may also include a universal serial bus (USB) port for communications over a cable, a Bluetooth® wireless interface, a radio-frequency identification (RFID) interface, a near-field communications (NFC) wireless interface, and/or any other type of interface that converts data from one form to another form.

As will be described in detail below, device 400 may perform certain operations, and device 400 may perform these operations in response to processing unit 420 executing software instructions contained in a computer-readable medium, such as memory 430. A computer-readable medium may be defined as a non-transitory memory device. A memory device may be implemented within a single physical memory device or spread across multiple physical memory devices. The software instructions may be read into memory 430 from another computer-readable medium or from another device. The software instructions contained in memory 430 may cause processing unit 420 to perform processes described herein. Alternatively, hardwired circuitry may be used in place of, or in combination with, software instructions to implement processes described herein. Thus, implementations described herein are not limited to any specific combination of hardware circuitry and software.

Although FIG. 4 shows exemplary components of device 400, in other implementations, device 400 may include fewer components, different components, additional components, or differently arranged components than those depicted in FIG. 4. Additionally or alternatively, one or more components of device 400 may perform one or more tasks described as being performed by one or more other components of device 400.

FIG. 5 shows an exemplary communications device 500 that may correspond to mobile device 210. As shown in FIG. 5, communications device 500 may include a housing 510, a speaker 520, a display screen 530, control buttons 540, a microphone 550, and/or camera element 560. Housing 510 may include a chassis via which some or all of the components of communications device 500 are mechanically secured and/or covered. Speaker 520 may include a component to receive input signals from communications device 500 and transmit audio output signals, which communicate audible information to a user of communications device 500.

Display screen 530 may include a component to receive input signals and present a visual output in the form of text, images, videos and/or combinations of text, images, and/or videos. In one implementation, display screen 530 may selectively present a portion of program data 102 and/or present a user interface to receive program data 102. In one implementation, display screen 530 may display text that is input into communications device 500, text, images, and/or video received from another device, and/or information regarding incoming or outgoing calls or text messages, emails, media, games, phone books, address books, the current time, etc. In one implementation, display screen 530 may correspond to a touch screen that includes a component to detect an input. For example, display screen 530 may include a pressure sensor and to detect touch for inputting content to touch screen 530. Alternatively or additionally, display screen 530 may include a capacitive or field sensor to detect a touch or proximity of the user or an input device to display screen 530. In certain implementations, interface 100 may be presented by display screen, and a user selection of a tab 110, a call element 130, and/or an action element 140.

Control buttons 540 may include one or more buttons that accept or otherwise detect an input from the user (e.g., the user presses a control button or combinations of control buttons) and send electrical signals to a processor (not shown) that may cause communications device 500 to perform one or more operations. For example, control buttons 540 may be used to cause communications device 500 to perform operations related to a selection of a tab 110, a call element 130, and/or action element 140.

Microphone 550 may include a component to receive audible information from a user and send, as output, a signal transmitted to another user device, or cause the device to perform one or more operations. In one implementation, microphone 550 may capture audio data from an associated user, and communications device 500 may convert the audio data (e.g., by performing a speech-to-text conversion) into a portion of program data.

Camera element 560 may be provided on a front or back side of communications device 500, and may include a component to receive, as input, optical signals and send, as output, a digital image or video that can be, for example, viewed on touch screen 530, stored in the memory of communications device 500, discarded and/or transmitted to another communications device 500. In one implementation, camera element 560 may capture image data, and communication device 500 may identify its location based on the captured image data.

Depending on the implementation, communications device 500 may include additional, fewer, different, or a different arrangement of components than those illustrated in FIG. 6. For example, in one implementation, communications device 500 may include a volume control button/rocker, power on/off button, etc. on one or more sides of communications device 500.

FIG. 6 is a flowchart of a process 600 for providing interface 100 that allows a user to make a selection on an IVR system by responding to interactive dialog 101 provided by the IVR system (e.g., via call elements 130) or through a GUI presenting selection options (e.g., via action elements 140). In some implementations, process 600 may be performed by mobile device 210. In other implementations, some or all of process 600 may be performed by another device or a group of devices separate from and/or including mobile device 210, such as interface content server 230 and/or IVR server 240.

As shown in FIG. 6, process 600 may include detecting a call to an IVR system (block 610). For example, mobile device 210 may determine when a user enters (e.g., using call elements 130) a telephone number associated with the IVR system. For example, mobile device 210 may determine whether a call is being made to an IVR associated with emergency services (e.g., as described above with respect to FIG. 1E). In another example, mobile device 210 may determine that an entity identified in associated call data region 120 is associated with an IVR system. For example, mobile device 210 may determine whether the entity includes a term or combination of terms (e.g., "customer support") associated with an IVR system and/or a contact center 250. Additionally or alternatively, mobile device 210 may determine when interactive dialog 101 is received during a telephone call. For example, mobile device 210 may determine whether a distinctive sound and/or sound pattern associated with interactive dialog 101 is received during a telephone call. In another situation, a user may interact with the IVR system solely through interface 100 (e.g., by selecting an appropriate tab 110 and/or actions element 140 (e.g., without establishing a call to the IVR system and/or without receiving interactive dialog 101).

As shown in FIG. 6, process 600 may further include mobile device 210 determining data for generating interface 100 (block 620). For example, with reference to FIG. 2, mobile device 210 may parse IVR data (received from IVR server 240) that is carrying interactive dialogue 101 to determine one or more selection options presented by interactive dialogue 101. Additionally or alternatively, mobile device 210 may receive, from interface content server 230, interface content data carrying information identifying the contents of interactive dialog 101. Furthermore, the interface content data may include information identifying the status of a contact center 250, and mobile device 210 may identify available options to present in view of the status of the contact center 250. For example, mobile device 210 may determine contact center 250 representatives who are identified within the interface content data, and mobile device 210 may identify an available subset of the representatives. For example, mobile device 210 may identify one or more of the representatives who are not currently helping other users and/or are expected to be available within a threshold amount of time.

In one implementation, mobile device 210 may forward data to interface content server 230 and/or IVR server 240 identifying mobile device 210 and/or an associated user. Mobile device 210 may receive options that are available to mobile device 210 and/or the associated user. For example, mobile device 210 may receive data that enables mobile device 210 to connect to customer service representatives who are knowledgeable about mobile device 210 and/or the user. In another example, as described above with respect to FIG. 1E, mobile device 210 may identify an appropriate emergency services entity (e.g., based on a location, cell tower, environmental conditions, etc. associated mobile device 210) and mobile device 210 may interface with an IVR system associated with the identified emergency services entity.

As further shown in FIG. 6, process 600 may also include presenting interface 100 (block 630), receiving a selection (block 640), and forwarding the selection to the IVR system (block 650). For example, as described above with respect to FIGS. 1A-1C, mobile device 210 may present interface 100 that include call element 130 and action elements 140 that identify one or more possible actions associated with the IVR system (e.g., to speak to a customer service representative). Mobile device 210 may receive a selection from interactive dialog via a call element 130, or may receive a selection of a particular action by via an action element 140. Process 600 may then return to block 630 to update interface 100 based on the selection. For example, action elements 140 may be updated to identify actions that may be available to the user based on a prior selection and/or execution of the prior selection.

Accordingly, process 600 may include monitoring menu options presented by interface content server 230 through action items 140. When interface content server 230 detects a selection of an action item 140, interface content server 230 may forward information to IVR server 240 identifying the selection and IVR server 240 may request an appropriate action with respect to contact center 250. When audio dialogue 101 changes, IVR server 240 may forward updates to interface content server 230, and interface content server 230 may forward data to mobile device 210 to change action elements 140. For example, if contact center 250 goes off line or the user is transferred to a different contact center 250, interface content server 230 may cause mobile device 210 to present new action elements 140 associated with new audio dialog 101 presented by IVR server 240.

FIG. 7 shows an example of how a menu 710 included in interactive dialog 101 may be used to generate action elements 140 included in interface 100. For example, menu 710 (which is provided to the user via a speaker in mobile device 210) may prompt the user to make a first selection of a first set of options or performing "Action A" (such as speaking to a first service representative). If the user opts to hear the first set of options (e.g., by selecting a call element associated with number 1 or by speaking an appropriate sound/word into mobile device 210 device), menu 710 may prompt the user to make a second selection of "Option 1" (such as receiving certain data), hearing a second set of options, or performing "Action B" (such as speaking to a second service representative). If the user opts to hear the second set of options (e.g., by selecting a call element associated with number 2), menu 710 may prompt the user to make a second selection of "Option 2", performing "Action C" (such as speaking to a third service representative), or "Option 3." In this example, action elements 140 in interface 100 may be populated to identify Actions A, B, and C. For example, mobile device 210 may search through menu 710 to identify words or phrases associated with Actions or other indications of the Actions. In this way, the user may use interface 100 to select between Actions A, B, and C using action elements 140. For example, the user may select Action C by selecting a corresponding action element 140, or the user may select Action C through menu 710 by selecting the sequence of numbers 1, 2, and 2 through call elements 130. Thus, action elements 140 enable the user to select an action using relatively few inputs and without reviewing interactive dialog 101.

In one implementation, when a similar action (e.g., communicating with the same service representative) is offered in two or more portions of menu 710, the multiple similar actions may be consolidated into single action element 140.

As described above with respect to FIG. 1C, action elements 140 may further include information regarding the status of contact center 250, such as an expected wait time for communicating with a service representative. In one implementation, if the expected wait time for communicating with a service representative exceeds a threshold amount of time, interface 100 may include action item 140 for recording a message for the service representative, even if recording a message is not available as an option in menu 710.

In one example, duplicate audible options in menu 710 may by identified and may be consolidated in to a single action element 140. For example, portions of interactive dialog 101 may be analyzed to identify portion of substantially similar audio content (e.g., different portions of menu 710 related to similar actions).

In the preceding specification, various preferred embodiments have been described with reference to the accompanying drawings. It will, however, be evident that various modifications and changes may be made thereto, and additional embodiments may be implemented, without departing from the broader scope of the invention as set forth in the claims that follow. The specification and drawings are accordingly to be regarded in an illustrative rather than restrictive sense.

For example, while a series of blocks have been described with respect to FIG. 6, the order of the blocks and/or signals may be modified in other implementations. Further, non-dependent blocks and/or signals may be performed in parallel.

It will be apparent that systems and/or methods, as described above, may be implemented in many different forms of software, firmware, and hardware in the implementations illustrated in the figures. The actual software code or specialized control hardware used to implement these systems and methods is not limiting of the embodiments. Thus, the operation and behavior of the systems and methods were described without reference to the specific software code—it being understood that software and control hardware can be designed to implement the systems and methods based on the description herein.

Further, certain portions, described above, may be implemented as a component that performs one or more functions. A component, as used herein, may include hardware, such as a processor, an ASIC, or a FPGA, or a combination of hardware and software (e.g., a processor executing software).

It should be emphasized that the terms "comprises"/"comprising" when used in this specification are taken to specify the presence of stated features, integers, steps or components but does not preclude the presence or addition of one or more other features, integers, steps, components or groups thereof.

The term "logic," as used herein, may refer to a combination of one or more processors configured to execute instructions stored in one or more memory devices, may refer to hardwired circuitry, and/or may refer to a combination thereof. Furthermore, a logic may be included in a single device or may be distributed across multiple, and possibly remote, devices.

For the purposes of describing and defining the present invention, it is additionally noted that the term "substantially" is utilized herein to represent the inherent degree of uncertainty that may be attributed to any quantitative comparison, value, measurement, or other representation. The term "substantially" is also utilized herein to represent the degree by which a quantitative representation may vary from a stated reference without resulting in a change in the basic function of the subject matter at issue.

To the extent the aforementioned embodiments collect, store or employ personal information provided by individuals, it should be understood that such information shall be used in accordance with all applicable laws concerning protection of personal information. Additionally, the collection, storage and use of such information may be subject to consent of the individual to such activity, for example, through well known "opt-in" or "opt-out" processes as may be appropriate for the situation and type of information. Storage and use of personal information may be in an appropriately secure manner reflective of the type of information, for example, through various encryption and anonymization techniques for particularly sensitive information.

No element, act, or instruction used in the present application should be construed as critical or essential to the embodiments unless explicitly described as such. Also, as used herein, the article "a" is intended to include one or more items. Further, the phrase "based on" is intended to mean "based, at least in part, on" unless explicitly stated otherwise.

What is claimed is:

1. A method comprising:
receiving, by a mobile device, options menu data including interactive audio prompts for a plurality of optional actions to be performed through an interactive voice response ("IVR") system responsive to a user selecting from the plurality of optional actions using call elements associated with corresponding audible user inputs;
presenting, by a speaker associated with the mobile device, the interactive audio prompts;
presenting, by a display associated with the mobile device and during the presenting of the interactive audio prompts, a graphical user interface ("GUI") generated by the mobile device using the options menu data, wherein the GUI includes the call elements, and graphical action elements that correspond to one or more of the plurality of optional actions, wherein the graphical action elements include:
a first graphical action element, identifying a first contact at a call center and a first expected wait time, for establishing a call between the mobile device and the first contact, wherein the first expected wait time is less than a first threshold amount of time, and
a second graphical action element, identifying a second contact at the call center, for recording a message from the user for the second contact, via the mobile device, wherein a second expected wait time for establishing a call between the mobile device and the second contact exceeds the first threshold amount of time;
detecting, by the mobile device, a selection by the user of one of the call elements or one of the graphical action elements, wherein the selection occurs while one of the interactive audio prompts is being presented; and
forwarding, by the mobile device, an indication of the selection to the IVR system, wherein forwarding the indication includes:
when the selection is one of the call elements, presenting data associated with one of the audible user inputs associated with the one of the call elements to the IVR system, wherein the IVR system identifies one of the plurality of optional actions based on the sound one of the audible user inputs and the one of the interactive audio prompts, and
when the selection is one of the graphical action elements, forwarding, data associated with one of the graphical action elements to the IVR system.

2. The method of claim 1, wherein presenting the GUI includes:
identifying two or more of the plurality of optional actions that are duplicates; and
representing the two or more duplicate optional actions with a single one of the graphical action elements.

3. The method of claim 2, wherein the two or more duplicate optional actions relate to establishing a call between the mobile device and one of the first contact, or the second contact.

4. The method of claim 1, further comprising:
receiving status information associated with the first expected wait time;
updating, based on the status information, the first expected wait time; and
omitting, from the GUI and based on the updating, the first graphical action element responsive to a determination that the first expected wait time exceeds the first threshold amount of time.

5. The method of claim 4, wherein the status information is not included in the options menu data.

6. The method of claim 1, wherein the second graphical action element does not correspond to any of the plurality of optional actions.

7. The method of claim 6, wherein the interactive audio prompts do not include an interactive audio prompt for the recording of a message from the user for the second contact.

8. The method of claim 1, wherein presenting the GUI includes:
determining a dynamic extensible markup language ("DXML") document associated with the GUI, and
populating the DXML document based on identifiers associated with the plurality of optional actions to form the GUI.

9. A device comprising:
a communication interface;
a memory configured to store instructions; and
a processor configured to execute one or more of the instructions to:
receive, via the communication interface, options menu data including interactive audio prompts for a plurality of optional actions to be performed through an interactive voice response ("IVR") system responsive to a user selecting from the plurality of optional actions using call elements associated with corresponding audible user inputs;
cause the interactive audio prompts to be outputted by a speaker associated with the device;
present for display, during the presentation of the interactive audio prompts, a graphical user interface ("GUI") generated by the device using the options menu data, wherein the GUI includes the call elements, and graphical action elements that correspond to one or more of the plurality of optional actions, wherein the graphical action elements include:
a first graphical action element, identifying a first contact at a call center and a first expected wait time, for establishing a call between the device and the first contact, wherein the first expected wait time is less than a first threshold amount of time, and
a second graphical action element, identifying a second contact at the call center, for recording a message from the user for the second contact, via the device, wherein a second expected wait time for establishing a call between the device and the second contact exceeds the first threshold amount of time;

detect a selection by the user of one of the call elements or one of the graphical action elements, wherein the selection occurs while one of the interactive audio prompts is being presented; and forward an indication of the selection to the IVR system, wherein forwarding the indication includes:
  when the selection is one of the call elements, presenting data associated with one of the audible user inputs associated with the one of the call elements to the IVR system, wherein the IVR system identifies one of the plurality of optional actions based on the one of the audible user inputs and the one of the interactive audio prompts, and
  when the selection is one of the graphical action elements, forwarding, data associated with one of the graphical action elements to the IVR system.

10. The device of claim 9, wherein the second graphical action element does not correspond to any of the plurality of optional actions.

11. The device of claim 9, wherein the GUI is presented through an operating system stack associated with the device.

12. The device of claim 9, wherein the processor, when presenting the GUI, is further configured to:
  receive status information associated with the first expected wait time;
  update, based on the status information, the first expected wait time; and
  omit, from the GUI and based on the update, the first graphical action element responsive to a determination that the first expected wait time exceeds the first threshold amount of time.

13. The device of claim 12, wherein the status information is not included in the options menu data.

14. The device of claim 9, wherein the interactive audio prompts do not include an interactive audio prompt for the recording of a message from the user for the second contact.

15. The device of claim 9, wherein the processor, when presenting the GUI, is further configured to:
  determine a dynamic extensible markup language ("DXML") document associated with the GUI, and
  populate the DXML document based on identifiers associated with the plurality of optional actions to form the GUI.

16. A non-transitory computer-readable medium, comprising:
  a plurality of computer-executable instructions stored thereon, which, when executed by a processor associated with a device, cause the processor to:
    receive options menu data including interactive audio prompts for a plurality of optional actions to be performed through an interactive voice response ("IVR") system responsive to a user selecting from the plurality of optional actions using call elements associated with corresponding audible user inputs;
    cause the interactive audio prompts to be outputted by a speaker associated with the device;
    present for display, during the presentation of the interactive audio prompts, a graphical user interface ("GUI") generated by the device using the options menu data, wherein the GUI includes the call elements, and graphical action elements that include one or more of the plurality of optional actions, wherein the graphical action elements include:
      a first graphical action element, identifying a first contact at a call center and a first expected wait time, for establishing a call between the device and the first contact, wherein the first expected wait time is less than a first threshold amount of time, and
      a second graphical action element, identifying a second contact at the call center, for recording a message from the user for the second contact, via the device, wherein a second expected wait time for establishing a call between the device and the second contact exceeds the first threshold amount of time;
    detect a selection by the user of one of the call elements or one of the graphical action elements, wherein the selection occurs while one of the interactive audio prompts is being presented; and
    forward an indication of the selection to the IVR system, wherein forwarding the indication includes:
      when the selection is one of the call elements, presenting data associated with one of the audible user inputs associated with the one of the call elements to the IVR system, wherein the IVR system identifies one of the optional actions based on the one of the audible user inputs and the one of the interactive audio prompts, and
      when the selection is one of the graphical action elements, forwarding, data associated with one of the graphical action elements to the IVR system.

17. The non-transitory computer-readable medium of claim 16, wherein the one or more instructions, when causing the processor to present the GUI, further cause the processor to:
  receive status information associated with the first expected wait time;
  omit, from the GUI and based on the update, the first graphical action element responsive to a determination that the first expected wait time exceeds the first threshold amount of time.

18. The non-transitory computer-readable medium of claim 17, wherein the status information is not included in the options menu data.

19. The non-transitory computer-readable medium of claim 16, wherein the second graphical action element does not correspond to any of the plurality of optional actions.

20. The non-transitory computer-readable medium of claim 16, wherein the one or more instructions, when causing the processor to present the GUI, further cause the processor to:
  determine a dynamic extensible markup language ("DXML") document associated with the GUI, and
  populate the DXML document based on identifiers associated with the plurality of optional actions to form the GUI.

* * * * *